US009682437B2

(12) United States Patent
Platz et al.

(10) Patent No.: US 9,682,437 B2
(45) Date of Patent: Jun. 20, 2017

(54) MULTIPART ELECTRODE ARRAY AND METHOD FOR THE ELECTROCHEMICAL TREATMENT OF BLADES HAVING SHROUDING BANDS

(71) Applicant: MTU Aero Engines AG, Munich (DE)

(72) Inventors: Albin Platz, Ried-Baindlkirch (DE); Daniela Arbinger, Hund Rohrstetten (DE)

(73) Assignee: MTU AERO ENGINES AG, Munich (DE)

( * ) Notice: Subject to any disclaimer, the term of this patent is extended or adjusted under 35 U.S.C. 154(b) by 179 days.

(21) Appl. No.: 14/374,131

(22) PCT Filed: Jan. 25, 2013

(86) PCT No.: PCT/EP2013/000218
§ 371 (c)(1),
(2) Date: Jul. 23, 2014

(87) PCT Pub. No.: WO2013/110462
PCT Pub. Date: Aug. 1, 2013

(65) Prior Publication Data
US 2015/0027904 A1 Jan. 29, 2015

(30) Foreign Application Priority Data
Jan. 25, 2012 (DE) ......................... 10 2012 201 052

(51) Int. Cl.
B23H 9/10 (2006.01)
B23H 3/04 (2006.01)
B23H 7/26 (2006.01)

(52) U.S. Cl.
CPC ................. *B23H 3/04* (2013.01); *B23H 7/26* (2013.01); *B23H 9/10* (2013.01)

(58) Field of Classification Search
CPC ....................................................... B23H 9/10
See application file for complete search history.

(56) References Cited

U.S. PATENT DOCUMENTS 3,372,099 A   3/1968   Clifford
4,999,093 A   3/1991   Moracz
(Continued)

FOREIGN PATENT DOCUMENTS

DE   2111982 A1    9/1971
DE   1515195 A1   12/1971
(Continued)

*Primary Examiner* — Nicholas A Smith
(74) *Attorney, Agent, or Firm* — Abel Law Group, LLP

(57) ABSTRACT

The invention relates to a method for electrochemically machining blades of a turbomachine having at least one U-shaped or trapezoidal cross-sectional profile of the surface to be treated, wherein an electrode array having at least three electrodes that can be moved in different directions is provided. The electrodes are moved from a start position having a first distance to the surface to be machined into an end position having a second distance to the surface to be machined, wherein in the end position, a closed work surface of the electrodes having a negative shape of the surface contour of the surface to be machined is located opposite thereof. The invention further relates to an electrode array for carrying out an electrochemical machining, wherein the electrode array comprises at least three electrodes that can be moved in different directions to one another, and to stationary mounting, wherein the electrodes can be moved from a start position to an end position.

19 Claims, 2 Drawing Sheets

(56) References Cited

U.S. PATENT DOCUMENTS

| | | |
|---|---|---|
| 5,244,548 A | 9/1993 | Bruns et al. |
| 5,882,491 A | 3/1999 | Wardle |
| 8,097,131 B2 | 1/2012 | Matsuo et al. |
| 2010/0051476 A1 | 3/2010 | Matsuo et al. |
| 2013/0056365 A1 | 3/2013 | Bayer et al. |

FOREIGN PATENT DOCUMENTS

| | | |
|---|---|---|
| DE | 102010014242 A1 | 10/2011 |
| DE | 102011082795 A1 | 4/2012 |
| GB | 952719 A | 3/1964 |
| GB | 1309491 A | 3/1973 |
| JP | H05318230 A | 12/1993 |

MULTIPART ELECTRODE ARRAY AND METHOD FOR THE ELECTROCHEMICAL TREATMENT OF BLADES HAVING SHROUDING BANDS

BACKGROUND OF THE INVENTION

Field of the Invention

The present invention relates to a method for the electrochemical treatment of blades of a turbomachine, especially of an aircraft engine, and also to an electrode array for carrying out an electrochemical machining.

Discussion of Background Information

Electrochemical machining (ECM) is known for the machining of electrically conductive components and is used in the field of aircraft engine production for machining the engine blades.

Described in U.S. Pat. No. 4,999,093 A, for example, is an electrode array for the electrochemical machining of blades in which two sub-electrodes are movable in relation to each other in order to form the contour of the surface to be machined by means of the sub-electrodes. However, gaps are created by the sub-electrodes in the working surface of the electrodes in relation to the surface to be machined, or mutual influences are created by the sub-electrodes and lead to unevenness in the surface to be machined so that overall the proposed solution does not lead to uniformly machined surfaces and is therefore unsuitable for the machining of engine blades.

An electrode array is also known from WO 2006 137 525 A1, in which for each surface to be machined provision is made for two electrodes which are movable in relation to each other so that intricate contours can also be machined by the electrode array. However, the sub-electrodes which are movable in relation to each other are arranged so that they have to be moved in a defined sequence so that for a considerable machining time period different conditions exist for the electrochemical machining, which in turn leads to an uneven eroding action on the surface to be machined and irregularities in the machined surface.

DISCLOSURE OF THE INVENTION

Object of the Invention

It is therefore the object of the present invention to disclose an electrode array and a corresponding method for operating such an electrode array for the electrochemical machining of engine blades, in which the disadvantages of the prior art are avoided and in particular a uniform surface machining for achieving a high surface quality is possible, wherein the surface to be machined shall be able to have complex contours and especially undercuts. A corresponding electrode array, furthermore, shall be able to be produced and operated in a simple manner.

Technical Solution

This object is achieved by means of a method and an electrode array as set forth in the independent claims. Advantageous embodiments are the subject of the dependent claims.

The invention is distinguished by at least two multipart electrodes or at least three electrodes being provided for the machining of a surface, wherein the sub-electrodes of the multipart electrode or the three electrodes can be moved in different directions, specifically especially in relation to each other and in relation to a stationary mounting. The movability of the electrodes or sub-electrodes enables movement of the electrodes or sub-electrodes from a starting position with the electrodes at a first distance from the surface to be machined to an end position with the electrodes or their working surfaces at a second distance from the surface to be machined so that a uniform electrochemical erosion on the surface to be machined is possible.

In the case of the present invention, reference is made both to multipart electrodes and to a plurality of electrodes, wherein in this case it is merely stated that a plurality of electrodes can be seen to be a unit (multipart electrodes) or to be separate components without a technical difference between electrodes or sub-electrodes having to be made, provided that the electrodes or sub-electrodes separately fulfill their function as an electrode. Only the constructional arrangement of the sub-electrodes can differ from electrodes in as much as sub-electrodes can be arranged more in combination with each other, whereas electrodes can more likely be provided independently of each other.

The movement of the electrodes can be conducted in this case so that a closed working surface of the electrodes or sub-electrodes exists both in the starting position of the electrodes and in the end position and in essence is complementary to the surface topography of the surface to be machined.

The movement of the multipart electrodes can have a main direction of movement which can be distinguished by all the sub-electrodes having a movement proportion in this direction, for example in the direction of the blade airfoil of an engine blade which is to be machined. In particular, by means of the movement of at least three electrodes of an electrode array or of a multipart electrode an almost continuous and closed working surface of the electrodes with essentially an equal distance of the working surface from the surface to be machined over the machining period can be realized so that a uniform erosion can be established over the entire surface to be machined over the machining period.

By designing the electrode array with at least three movable electrodes or a multipart electrode with at least three movable sub-electrodes for machining a surface to be machined, it can also be ensured that all the electrodes reach their end position at basically the same time so that machining times of different duration are also avoided and the distance of the electrodes or sub-electrodes from the end contour of a surface to be machined is essentially the same.

In this way, uniform erosion conditions with an essentially equal distance of the working surface of the electrodes from the surface to be machined can be realized both over the entire machining period and over the entire surface to be machined.

In this case, the longitudinal sectional profile of the surface to be machined can be U-shaped or trapezoidal, wherein the surface to be machined can especially form a part of a trapezium, specifically the part with the longer base side (basis) and sides which extend obliquely thereto so that an undercut is created. Such a longitudinal sectional shape can be created for example by a longitudinal section of an engine blade with a shroud, by the contour of the blade airfoil and by a part of the blade root, e.g. in the region of a sealing fin. Such a complex surface contour can be machined in a simple manner using the method according to the invention or a corresponding electrode array in a single machining step.

The electrode array can be designed so that of the at least three electrodes or sub-electrodes of a multipart electrode at least a middle electrode or a middle sub-electrode moves along a linear line of movement, for example in the direction of the blade airfoil, whereas the outer electrodes or sub-electrodes—between which the at least one middle electrode or the at least one sub-electrode is arranged—move away outwardly at an angle from the direction of movement of the at least one middle electrode or of the at least one sub-electrode, specifically at an acute angle of between 30° and 60° between the lines of movement of the least one middle electrode or of the at least one sub-electrode on the one hand and of an outer electrode on the other hand.

In the electrode array, the outer electrodes of the at least three electrodes or the outer sub-electrodes of a multipart electrode can be arranged in front of the at least one middle electrode or of the at least one sub-electrode, as seen in the direction of movement, with regard to their working surfaces, that is to say can initially be arranged in relation to the surface to be machined, and in particular can cover the working surface of the at least one middle electrode or of the at least one sub-electrode in the starting position. The at least one middle electrode or the at least one sub-electrode can correspondingly slightly trail behind during the movement of the outer electrodes.

The electrodes or sub-electrodes can be of an insulated construction in relation to each other and can correspondingly be supplied with different electrical potentials. In particular, the at least one middle electrode or the at least one middle sub-electrode can be insulated in relation to the outer electrodes or sub-electrodes and can be operated with a different voltage in order to compensate for possibly existing slight differences in the gap width between the working surfaces of the electrodes and the surface to be machined by a corresponding change of the potential differences or of the voltage ratios.

The electrodes or sub-electrodes can move on linear movement paths. Furthermore, a uniform movement at constant speed can be established.

The electrodes or sub-electrodes can also be coupled to each other so that their movement is matched to each other and their mutual movement is forcibly controlled as a result of the coupling. Additionally or alternatively, controlling is also possible by means of a suitable open-loop or closed-loop control unit.

A plurality of electrodes, for example 4, 6 or more electrodes, can be arranged in a star-like manner around a machining position, for example an engine blade, in order to be able to machine different sides of the engine blade which is to be machined. In this case, multipart electrodes, especially electrodes with three sub-electrodes, can be used, wherein the sub-electrodes can be lined up in a plane transversely to a plane in which the multipart electrodes are arranged. As a result, multiple sides of an engine blade and also the different regions of the engine blade which are exposed to the gas flow in the gas passage, that is to say for example blade airfoil region and shroud regions of the different sides of the engine blade, can be machined even if undercuts are present there.

EXEMPLARY EMBODIMENT

Further advantages, characteristics and features of the present invention are evident in the following detailed description of an exemplary embodiment with reference to the attached drawings. However, the invention is not limited to this exemplary embodiment.

Figure 1:
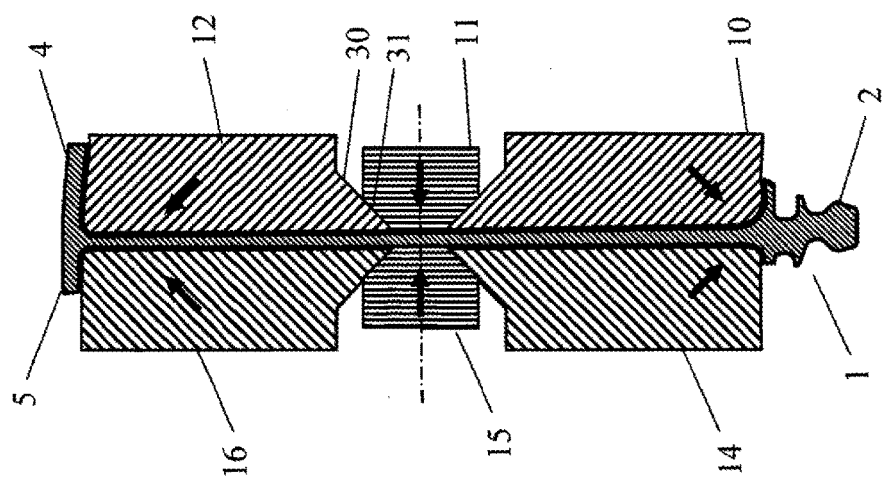
FIG. 1 shows a longitudinal sectional view for an electrode array according to the invention before commencement of an electrochemical machining of an engine blade.

FIG. 1 shows an electrode array according to the invention which altogether comprises six electrodes 10, 11, 12, 14, 15, 16 which are arranged on both sides of an engine blade 1 which is to be machined. Alternatively, two electrode arrays with three electrodes in each case could also be provided. Therefore, it is possible to machine both sides of the blade airfoil 3 at the same time. It would also be conceivable, however, to undertake only one-sided machining of the turbine blade 1 so that in the minimum configuration the electrode array could comprises three electrodes.

The electrodes are connected in a suitable manner to a voltage source which in this case is not shown for the sake of simplicity. Conventionally, the electrodes 10, 11, 12, 14, 15, 16 are poled as cathodes, whereas the turbine blade 1 is connected as an anode.

The electrodes 10, 11, 12, 14, 15, 16 can be mutually insulated in order to be able to apply a different electric potential. In the depicted exemplary embodiment of FIG. 1, for example the electrode 11 is insulated in relation to the adjacent, outer electrodes 10 and 12 and is supplied separately with a voltage from a voltage source.

The turbine blade 1 to be machined has a blade root 2, by means of which the turbine blade 1 is arranged in a turbine disk. A the opposite end, two shrouds 4 and 5, which with so-called sealing fins in the region of the blade root 2 define the flow region for the fluid of the turbomachine, are arranged on the blade airfoil 3. Created as a result is a surface of the turbine blade 1 to be machined which extends on both sides of the blade airfoil 3 from the shrouds 4 and 5, over the blade airfoil 3, right into the root region 2 and in section has a U-shaped or trapezoidal contour. In the depicted exemplary embodiment of FIG. 1, this surface 8 to be machined exists on the two sides of the blade airfoil 3 so that a corresponding surface 8, which is U-shaped or trapezoidal in section and is to be machined by means of the electrodes 10, 11, 12, 14, 15, 16, is associated in each case with three electrodes of the electrode array.

As a result of the trapezoidal shape in longitudinal section of the blade, in which the shorter base side is open and the longer base side (basis) is formed by the blade airfoil 3, an undercut 6 is created in the direction of a normal to the blade airfoil 3 by the shroud 4 which extends at an angle to the blade airfoil to the open side of the trapezium, which undercut leads to the distance of the electrode from the shroud 4 in the region of the transition to the blade airfoil being greater than at the edge of the shroud 4 during a linear movement of an electrode in the direction of the normal of the blade airfoil 3. During an electrochemical machining, in addition to the set voltage, there is essentially dependence upon the distance between the electrodes, i.e. working surface of the electrode and the component to be machined, however, so that in the region of the undercut 6 the erosion at the edge of the shroud 4 would be greater than in the region of the undercut.

This problem is now remedied by means of the three-part electrode array on both sides of the blade airfoil 3 by the electrodes 10 and 12 or 14 and 16 moving at an angle to the direction of movement of the electrodes 11 or 15 towards the surface 8 of the turbine blade to be machined during the machining process. FIG. 1 shows the initial position in which a gap 7 is set with a first distance of the surface 8 of the engine blade 1 to be machined from the working surfaces 20, 22, 24 and 26 of the electrodes 10, 12, 14, 16. The working surfaces 20, 22, 24 and 26 of the electrodes 10, 12, 14, 16 in this case form a complementary surface to the surface 8 to be machined so that the width of the gap 7 is basically the same over the entire surface 8 to be machined. The working surface 20 of the electrode 12 in this case is especially designed to be correspondingly complementary to the undercut 6 across the shroud 4.

The working surfaces 21 and 25 of the electrodes 11 and 15 are concealed in the starting position shown in FIG. 1 by the working surfaces 20, 22 of the electrodes 12, 10 or by the working surfaces 26, 24 of the electrodes 16, 14 and do not constitute any part of the overall working surface of the electrodes.

However, this situation changes if the electrochemical machining of the turbine blade 1 has commenced, and the electrodes 10, 11, 12, 14, 15, 16 move at constant speed in the direction of the engine blade 1. During this, the electrodes 11, 15 move towards each other in exactly opposite directions, specifically transversely to the blade airfoil, preferably along the normal of the blade airfoil surface.

In contrast, the respective outer electrodes 10, 12 or 14, 16 move at an angle obliquely to the direction of movement of the middle electrodes 11, 15, specifically within an angular range of 30° to 60°, wherein in the depicted exemplary embodiment the angle is approximately 45° in each case if the acute angle is taken between the lines of movement of the electrodes 11, 15 or 12, 10 and 14, 16 regardless of the direction of movement. Taking into account the direction of movement and the assumption that the direction of movement of the electrode 15 is 0° and the direction indication is correspondingly in the clockwise direction, the electrode 14 moves approximately at 45°, the electrode 10 at 135°, the electrode 11 at 180°, the electrode 12 at 225° and the electrode 16 at 315°.

Figure 2:
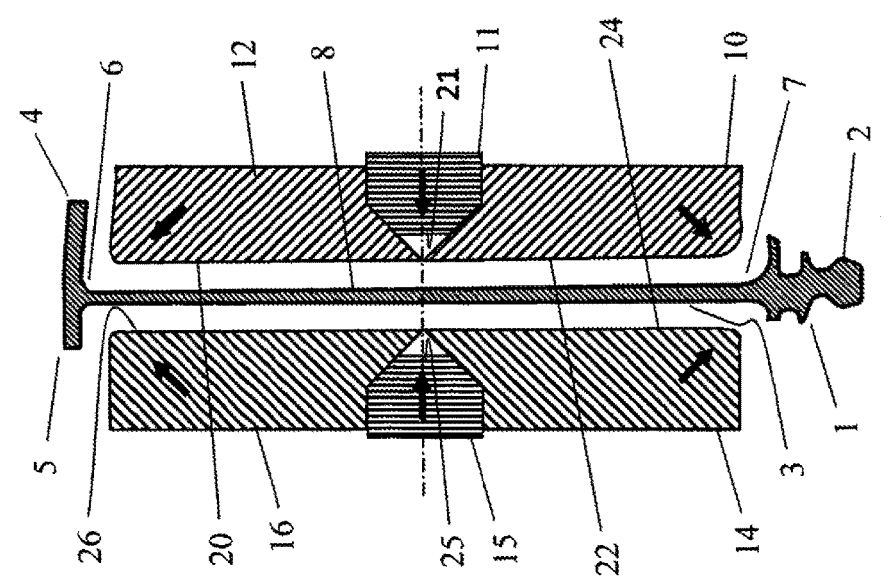
FIG. 2 shows a longitudinal sectional view of the electrode array from FIG. 1 at the end of the electrochemical machining of an engine blade.

As a result of this type of movement of the electrodes 10, 11, 12, 14, 15, 16, it achieves the effect of the gap 7 between the working surfaces 20, 21, 22, 24, 25, 26 of the electrodes 10, 11, 12, 14, 15, 16 and the surface 8 of the turbine blade 1 to be machined being uniformly reduced until the end position shown in FIG. 2 is reached. The gap, which is created between the electrodes 10, 12 or 14, 16 as a result of the obliquely outwardly extending movement, is filled in the same way by means of the respectively middle electrode 11, 15 so that a closed working surface of the electrodes, which is complementary to the surface 8 of the blade 1 to be machined, is also created in the end position, wherein in particular the same distance basically exists between the surface to be machined and the working surface of the electrodes.

Since the electrodes 11, 15 slightly trail behind the movement of the electrodes 10, 12, 14, 16, a different potential can be set on the electrodes 11, 15 as a result of the insulated design of the electrodes 11, 15 in relation to the electrodes 10, 12, 14, 16 and of the separate voltage supply so that possible differences in the forming of the gap 7 between the surface 8 to be machined and the working surfaces 20, 21, 22, 24, 25, 26 can be compensated by adjustment of the potential.

By the forming of inclined surfaces 30, 31 on the adjacent electrodes, such as electrodes 11 and 12, that is to say the middle electrode 11 and an outer electrode 12, coupling of the movements of the electrode 11 and the electrode 12 can be achieved, enabling a coordinated movement of the middle electrodes 11, 15 and of the outer electrodes 10, 12, 14, 16. In addition to the forming of the inclined surfaces 30, 31 shown here, other suitable coupling measures for coupling the movements of the electrodes, and especially of the middle electrodes 11, 15, with the outer electrodes 10, 12, 14, 16 can also be applied.

Figure 3:
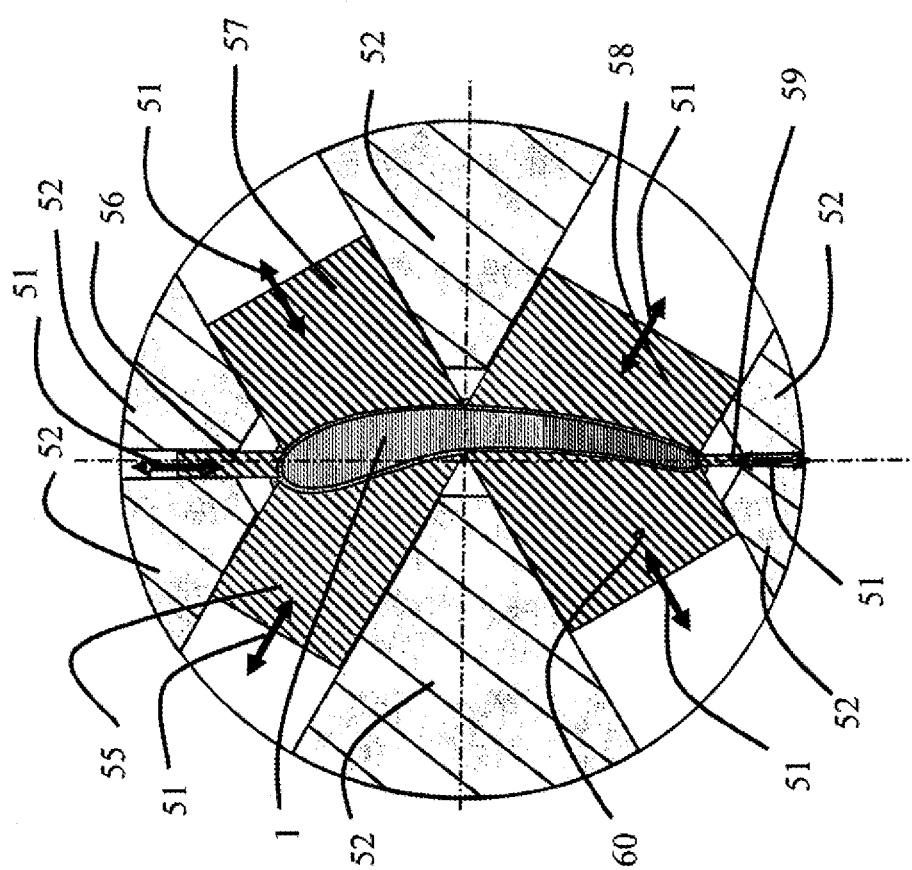
FIG. 3 shows a cross-sectional view of an electrode array with a plurality of multipart electrodes in a star-like arrangement, wherein each multipart electrode can be formed by means of an electrode array according to FIGS. 1 and 2.

FIG. 3 shows a cross section through an engine blade 1 and an electrode array which is arranged in a star-like manner around this for the machining of said engine blade. The electrode array comprises six electrodes 55 to 60, of which each is of multipart design, specifically corresponding to the embodiment which is shown in FIGS. 1 and 2 so that the electrodes which are shown there form sub-electrodes of the multipart electrodes 55 to 60.

The multipart electrodes 55 to 60 are separated from each other by means of sealing elements 52 of the purging chamber. The double arrows 51 shows the main directions of movement of the electrodes 55 to 60, wherein the respective outer sub-electrodes 10, 12, 14, 16 move at an angle to the plane of the drawing, whereas the middle sub-electrodes 11 and 15 are displaced parallel to the plane of the drawing.

As result of the design according to the invention of the electrode array and also of the corresponding operation of such electrode arrays with regard to the machining of engine blades especially with two shrouds which have undercuts, an accurate machining of the turbine blades by electrochemical machining can be carried out in a simple manner, wherein a high quality of the machined surface results. In particular, in the region of the shrouds 4, 5 or of the remaining working surface of the electrodes 12, 16 excellent machining is possible, making aftermachining superfluous. Furthermore, the starting point of the electrodes can be selected to be closer to the surface to be machined so that the distance which the electrodes have to cover during the machining can be reduced, which gives an advantage with regard to machining time.

Furthermore, the electrode array can be realized in a simple manner and combined with other measures for optimizing the machining results, such as machining with electrodes in a star-like arrangement for avoiding a lateral gap, or machining with specifically reduced active recessed surfaces for improving the gap conditions over curved blade airfoil regions.

Although the present invention has been described in detail based on the exemplary embodiment, for the person skilled in the art it goes without saying that the invention is not limited to this exemplary embodiment but that on the contrary modifications are possible in a way that individual features are omitted or different combinations of features are put into effect. The present invention discloses all combinations of the submitted individual features.

What is claimed is:

1. A method for the electrochemical machining of a blade of a turbomachine, wherein the method comprises using at least three multipart electrodes, each comprising at least three sub-electrodes which are lined up in a plane transversely to a plane in which the multipart electrodes are arranged, which multipart electrodes are moved with a main direction of movement toward the blade airfoil in a star-like manner from an initial position at a first distance from a surface to be machined to an end position at a second distance from an end contour of the surface to be machined so that in the end position a closed working surface of the electrodes with a negative shape lies opposite the end contour of the surface to be machined, the blade having a gas passage region and comprising shrouds at a blade root and/or at a blade tip, which shrouds are inclined on one side or on both sides so that undercuts exist in the gas passage region.

2. The method of claim 1, wherein all of the sub-electrodes arrive at the end position at the same time.

3. The method of claim 1, wherein outer sub-electrodes are moved at an angle of 30° to 60° to a main direction of movement of the electrode in a direction of the shrouds, whereas one or more middle electrodes close a freed gap in a region of a blade airfoil.

4. The method of claim 1, wherein two multipart electrodes are offset by 180° and arranged pointing towards each other, their main direction of movement lying on an axis in a direction of a blade airfoil.

5. The method of claim 1, wherein there are used at least four multipart electrodes whose main direction of movement is towards the blade airfoil in a star-like manner.

6. The method of claim 1, wherein there are used at least six multipart electrodes whose main direction of movement is towards the blade airfoil in a star-like manner.

7. The method of claim 1, wherein working surfaces of electrodes or sub-electrodes, during movement from the initial position to the end position, are at different distances from the blade surface to be machined so that at least one electrode or one sub-electrode leads or trails in relation to the other electrodes or sub-electrodes, the blade having at least one U-shaped or trapezoidal cross-sectional profile of the surface to be machined.

8. The method of claim 7, wherein the electrodes have in each case a working surface contour which is complementary to a part of the surface to be machined.

9. The method of claim 7, wherein the U-shaped or trapezoidal cross-sectional profile of the surface to be machined is formed by a shroud, by a blade airfoil and by a part in a region of a blade root.

10. The method of claim 9, wherein at least one part of the shroud is oriented in relation to the blade airfoil so that an undercut is formed with regard to a direction parallel to a surface normal to the blade airfoil.

11. The method of claim 7, wherein trailing sub-electrodes or electrodes are electrically insulated in relation to leading sub-electrodes of the multipart electrode or electrodes and are supplied with a higher voltage.

12. The method of claim 7, wherein all sub-electrodes or electrodes in the end position have essentially the same distance from an end contour of the surface to be machined.

13. The method of claim 7, wherein sub-electrodes are insulated in relation to outer electrodes or sub-electrodes.

14. The method of claim 13, wherein a middle sub-electrode is insulated in relation to outer electrodes or sub-electrodes.

15. The method of claim 7, wherein electrodes or sub-electrodes are supplied with a different voltage.

16. The method of claim 15, wherein a middle sub-electrode is supplied with a different voltage.

17. The method of claim 16, wherein the middle sub-electrode is supplied with a voltage so that an effective electrochemical distance corresponds to a distance of the sub-electrodes from the surface to be machined.

18. The method of claim 1, wherein sub-electrodes are insulated in relation to outer sub-electrodes.

19. The method of claim 1, wherein sub-electrodes are supplied with a different voltage.

* * * * *